United States Patent [19]

Nakagawa

[11] Patent Number: 4,761,574

[45] Date of Patent: Aug. 2, 1988

[54] LINEAR PULSE MOTOR

[75] Inventor: Hiroshi Nakagawa, Mie, Japan

[73] Assignee: Shinko Electric Co., Ltd., Tokyo, Japan

[21] Appl. No.: 105,447

[22] Filed: Oct. 2, 1987

Related U.S. Application Data

[63] Continuation of Ser. No. 803,492, Dec. 2, 1985.

[30] Foreign Application Priority Data

May 18, 1983 [JP] Japan .................................. 58-87937
May 18, 1984 [JP] Japan .................................. 58-165589

[51] Int. Cl.[4] ............................................. H02K 41/00
[52] U.S. Cl. ....................................... 310/12; 310/181
[58] Field of Search ................................. 310/12–14, 310/135, 181

[56] References Cited

U.S. PATENT DOCUMENTS

3,999,107 12/1976 Reuting ........................ 310/181 X
4,370,577 1/1983 Wakabayashi ..................... 310/12
4,504,750 3/1985 Onodera et al. ................... 310/12

Primary Examiner—Mark O. Budd
Assistant Examiner—Judson H. Jones
Attorney, Agent, or Firm—Dennis J. Williamson

[57] ABSTRACT

A linear pulse motor includes: a movable body having plural iron cores provided with coils, the iron cores extending along the moving direction of the movable body in parallel with each other and having plural magnetic poles arranged along the moving direction; a stationary body having magnetic circuit forming members for forming magnetic circuits with the iron cores across an air gap between the iron cores and the magnetic circuit forming members, the magnetic poles extending towards the magnetic circuit forming members; and a permanent magnet arranged such that magnetic fluxes therefrom interact with magnetic fluxes generated by energization of the coils, wherein the coils are so arranged and energized that magnetic forces are generated between one or more of the magnetic poles and the magnetic circuit forming members of the stationary body at both sides of the center of the movable body in the moving direction, the one or more of the magnetic poles being substantially at the same distance from the center, and the magnetic forces at both sides of the center being substantially equal to each other.

8 Claims, 7 Drawing Sheets

Prior Art

LINEAR PULSE MOTOR

This application is a continuation, of application Ser. No. 803,492, filed 12-10-85.

BACKGROUND OF THE INVENTION

1. Field of the Invention

This invention relates to a linear pulse motor, and more particularly to a linear pulse motor in which a movable part is driven by interaction of the magnetic flux of permanent magnets with magnetic flux generated by energization of the coils.

2. Description of the Prior Art

A linear pulse motor is used, for example, for linearly moving and accurately positioning a head in a printer or an optical read-out apparatus, or a movable part in a numerically controlled machine tool.

Figure 1:
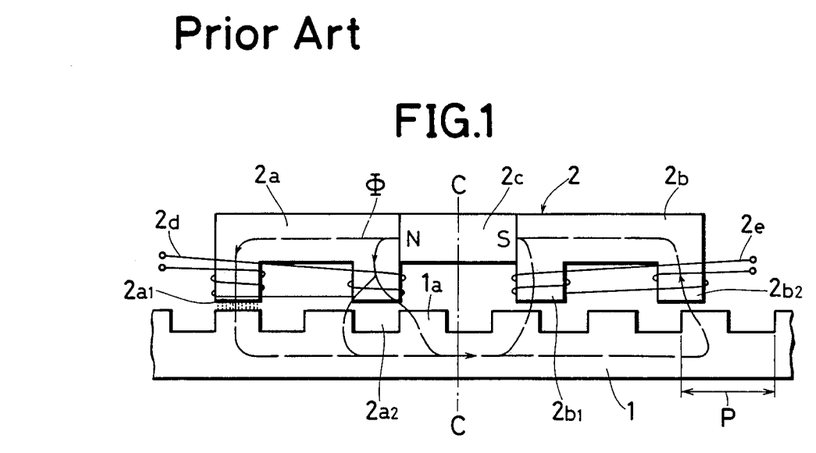
FIG. 1 a schematic side view of a linear pulse motor of the prior art.

FIG. 1 shows schematically a linear pulse motor of the Prior Art. A stationary body 1 is long and plate-like, being made of magnetic material. Teeth 1a are formed at regular pitches in the longitudinal direction of the stationary body 1. A movable body 2 consists of two iron cores 2a and 2b and a permanent magnet 2c between them. The iron cores 2a and 2b include downwardly extending magnetic poles 2a1, 2a2, and 2b1, 2b2 as magnetic teeth respectively. Coils 2d and 2e are wound on the magnetic poles 2a1, 2a2, and 2b1, 2b2, respectively. The winding directions of the coil 2d are opposite on the magnetic poles 2a1 and 2a2. Similarly, the winding directions of the coil 2e are opposite on the magnetic poles 2b1 and 2b2.

The magnetic poles or magnetic teeth 2a1 and 2a2 of the one iron core 2a are shifted from one another in phase by a half of pitch (½P) with respect to the magnetic teeth 1a of the stationary body 1. Similarly, the magnetic poles or magnetic teeth 2b1 and 2b2 of the other iron core 2b are shifted from one another in phase, by a half of pitch (½P) with respect to the magnetic teeth 1a, where the pitch P is equal to the pitch of the magnetic teeth 1a of the stationary body 1. Further, the iron cores 2a and 2b are so combined with the permanent magnet 2c that their magnetic teeth 2a1, 2a2, 2b1 and 2b2 are shifted by a quarter of the pitch (¼P) in phase from one another with respect to the magnetic teeth 1a of the stationary body 1, in the order of the magnetic teeth 2a1, 2b1, 2a2 and 2b2.

As well known, the coils 2d and 2e are energized and changed over in the following predetermined order: a positive DC current +I is supplied to the coil 2d for a predetermined time; when the coil 2d is deenergized, the other coil 2e is energized to supply the positive DC current +I for the predetermined time; a negative DC current −I is supplied to the coil 2d for the predetermined time; and when the coil 2d is deenergized, the other coil 2e is energized to supply the negative DC current −I for the predetermined time.

A magnetic flux Φ from the permanent magnet 2c flows as shown by the dash lines in the iron cores 2a, 2b and the stationary body 1. For example, when the positive DC current I is supplied to the coil 2d, the magnetic flux induced by the coil 2d is added to the magnetic flux Φ from the permanent magnet 2c in the magnetic teeth 2a1, while the former is cancelled with the latter in the other magnetic teeth 2a2. As shown in FIG. 1, a magnetic pull force is generated between the magnetic teeth 2a1 and one of the adjacent magnetic teeth 1a of the stationary body 1. The movable body 2 steps by the quarter of pitch (¼P). Although magnetic pull forces are generated between the magnetic teeth 2b1, 2b2 and the magnetic teeth 1a of the stationary body 1, by the magnetic flux Φ from the permanent magnet 2c, they are very small in comparison with the magnetic pull force between the magnetic teeth 2a1 and the adjacent one of the magnetic teeth 1a of the stationary body 1. This is true because a magnetic pull force is generally proportional to a square of magnetic flux density in the gap.

When the coils 2d and 2e are energized and changed over in the predetermined order, the movable body 2 actually moves forwards (leftwards) step by step in ¼ pitch. It appears to move smoothly and continuously forwards.

However, in the above construction, the magnetic pull force does not act on the movable body 2 in symmetry with respect to the center line C-C in the moving direction, rather it acts on the left or right portion of the movable body 2 in accordance with the change-over of the energization of the coils 2d and 2e. Although not shown, the movable body 2 is provided with a pair of front wheels (bearings) and a pair of rear wheels (bearings) which roll on the side end portions of the stationary body 1. The strength of the magnetic pull force acting on the wheels changes. When it is high in the front wheels, it is low in the rear wheels. When it is high in the rear wheels, it is low in the front wheels. Thus, the movable body 2 vibrates at its rear and front end portions, and it makes much noise. The noise level is considerably high.

Further, when the temperature of the movable body 2 changes in accordance with the condition of the energization of the coil and the ambient temperature, the iron cores 2a and 2b, and the permanent magnet 2c expand or contract, and so the pitches of the magnetic teeth 2a1, 2a2, 2b1 and 2b2 change. The pitch relationship between the magnetic teeth of the movable body 2 and stationary body 1 also change. this change of pitch deteriorates the stop accuracy or positioning accuracy of the movable body 2. As the result, the character pitches become irregular, for example, in the printer, and the printing quality is deteriorated.

SUMMARY OF THE INVENTION

In accordance with an aspect of this invention, a linear pulse motor comprises: a movable body having plural iron cores provided with coil means, said iron cores extending along the moving direction of said movable body in parallel with each other and having plural magnetic poles arranged along said moving direction; a stationary body having magnetic circuit forming means for forming magnetic circuits with said iron cores across an air gap between said iron cores and said magnetic circuit forming means, said magnetic poles extending towards said magnetic circuit forming means; and permanent magnet means so arranged that magnetic fluxes therefrom interact with magnetic fluxes generated by energization of said coil means, wherein said coil means is so arranged and energized that magnetic forces are generated between one or more of said magnetic poles and said magnetic circuit forming means of the stationary body at both sides of the center of said movable body in the moving direction, said one or more of the magnetic poles being substantially at the same distance from said center and said magnetic forces at both sides of said center being substantially equal to each other.

The foregoing and other objects, features, and advantage of the present invention will be more readily understood upon consideration of the following detailed description of the preferred embodiment of the invention, taken in conjunction with the accompaying drawings.

BRIEF DESCRIPTION OF THE DRAWINGS

FIG. 6A.to FIG. 9A are schematic side views of the linear pulse motor for explaining the operations;

FIG. 6B to FIG. 9B are views similar to FIG. 4 for explaining the operations.

DETAILED DESCRIPTION OF THE PREFERRED EMBODIMENT

Referring to FIG. 2 to FIG. 5, central magnetic teeth 11a are formed along the center line in a stationary body 11 made of magnetic material. Further, side magnetic teeth 11b1 and 11b2 are formed at both sides of the central magnetic teeth 11a in the stationary body 11, and are aligned with each other in the direction perpendicular to the moving direction A of a movable body 12. The pitches of the side magnetic teeth 11b1 and 11b2 are equal to the pitch P of the central magnetic teeth 11a. The side magnetic teeth 11b1 and 11b2 are shifted in phase by a half of the pitch ($\frac{1}{2}$P) from the central magnetic teeth 11a. The length l1 of the central magnetic teeth 11a is twice as large as that l2 of the side magnetic teeth 11b1 and 11b2.

Figure 2:
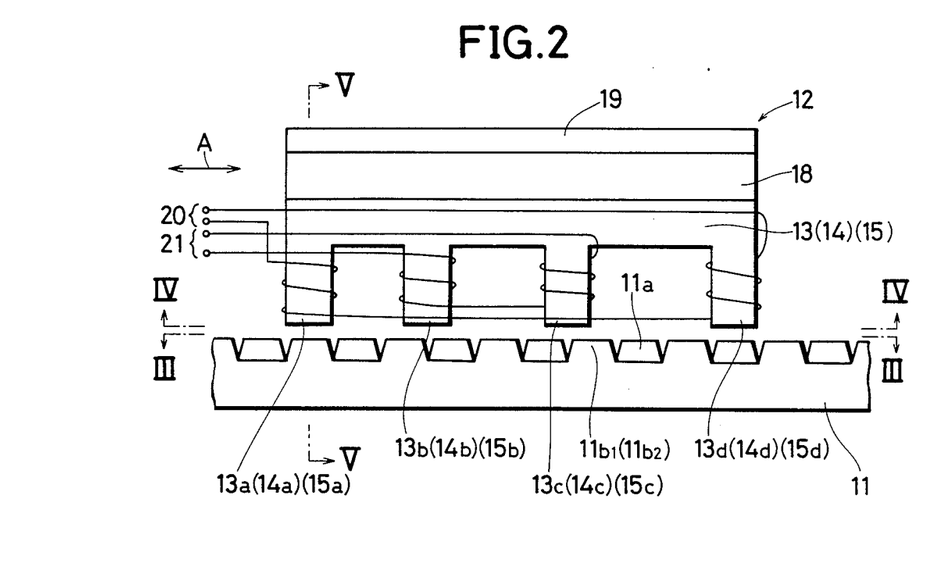
FIG. 2 is a schematic side view of a linear pulse motor according to a first embodiment of this invention.
Figure 3:
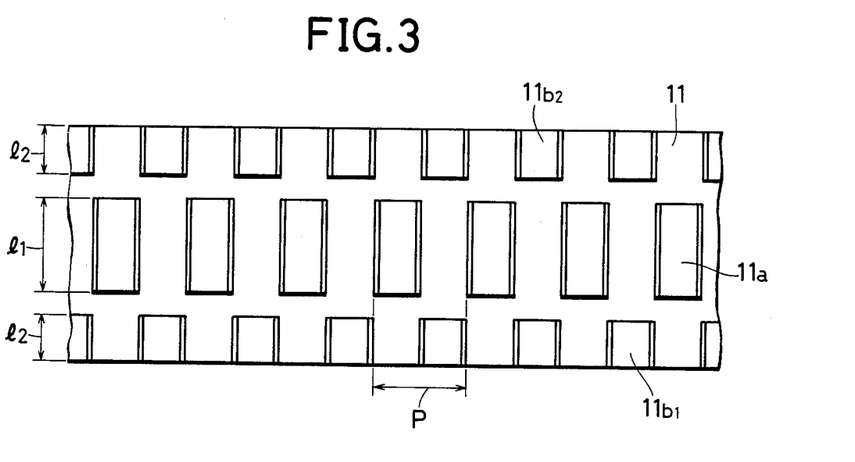
FIG. 3 is a plan view taken along the line III—II in FIG. 2.

The movable body 12 includes three iron cores 13, 14 and 15, spacers 16 and 17 interposed between the iron cores 13, 14 and 15, a permanent magnet 18 mounted on the iron cores 13, 14 and 15, a backplate 19 made of magnetic material, and coils 20 and 21.

The iron cores 13, 14 and 15 include four downwardly extending magnetic poles 13a to 13b, 14a to 14d and 15a to 15d, respectively. The magnetic poles 13a, 14a and 15a; 13b, 14b and 15b; 13c, 14c and 15c; and 13d, 14d and 15d are aligned with each other in the direction perpendicular to the moving direction A of the movable body 12. The spacers 16 and 17 are made of non-magnetic material. The iron cores 13, 14 and 15 are magnetically separated from each other by the spacers 16 and 17.

Figure 4:
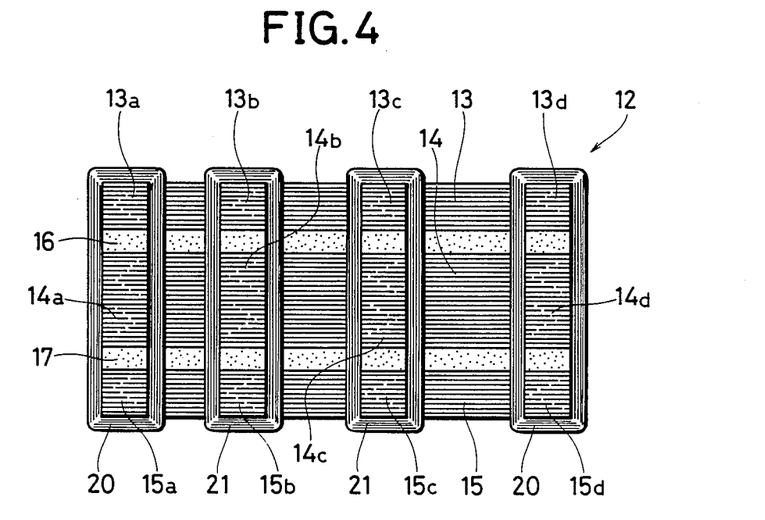
FIG. 4 is a back view taken along the line IV—IV in FIG. 2.
Figure 5:
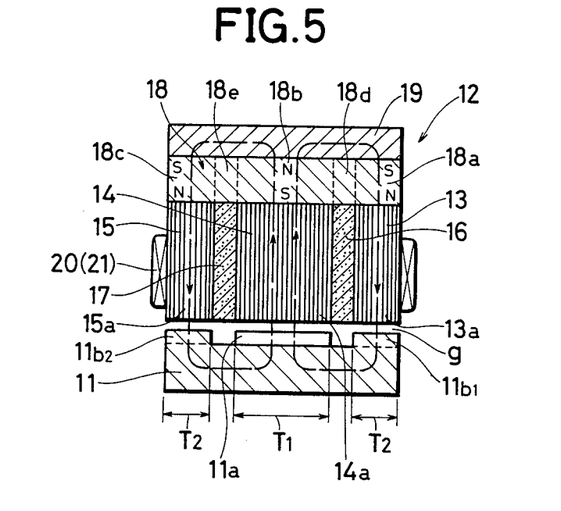
FIG. 5 is a cross-sectional view taken along the line V—V in FIG. 2.

The one coil 20 is wound on the magnetic poles 13a, 14a and 15a, and 13d, 14d and 15d. The winding directions of the one coil 20 are opposite on the magnetic poles 13a to 15a and 13d to 15d. The other coil 21 is wound on the magnetic poles 13b, 14b and 15b, and 13c, 14c and 15c. The winding directions of the other coil 21 are opposite on the magnetic poles 13b to 15b and 13c to 15c. The permanent magnet 18 consists of three magnet regions 18a, 18b and 18c which are magnetically intercepted from each other by nonmagnetic regions 18d and 18e, as shown in FIG. 5. The magnet regions 18a and 18c are magnetized in the same polarities, as shown in FIG. 4. The magnet region 18b is oppositely magnetized in the polarities to the magnet regions 18a and 18c. The magnet regions 18a and 18c are superimposed on the iron cores 13 and 15, respectively, while the magnet region 18b is superimposed on the center iron core 14. As shown in FIG. 5, the thickness $T_1$ of the center iron core 14 is twice as large as that $T_2$ of the iron cores 13 and 15. Magnetic fluxes from the permanent magnet 18 flow along magnetic paths as shown by dash lines in FIG. 5. The one magnetic path is formed by the one side iron core 15, air gap g, the stationary body 11, the center iron core 14 and the backplate 19. The other magnetic path is formed by the backplate 19, the other side iron core 13, air gap g, the stationary body 11 and the center iron core 14. The row of the central magnetic teeth 11a of the stationary body 11 faces directly towards the central iron core 14 of the movable body 12, while the rows of the side magnetic teeth 11b1 and 11b2 of the stationary body 11 face directly towards the side iron cores 13 and 15 of the movable body 12, respectively.

The magnetic poles 13a to 15a and 13d to 15d on which the one coil 20 is wound, are shifted from each other in phase by a half of pitch ($\frac{1}{2}$P) with respect to the side magnetic teeth 11b1, 11b2 or central magnetic teeth 11a of the stationary body 11. Similarly, the magnetic poles 13b to 15b and 13c to 15c on which the other coil 21 is wound, are shifted from each other in phase by a half of pitch ($\frac{1}{2}$P) with respect to the side magnetic teeth 11b1, 11b2 or central magnetic teeth 11a of the stationary body 11. Further, the magnetic poles 13a to 15a, 13b to 15b, 13c to 15c and 13d to 15d are so arranged that they are shifted by a quarter of the pitch ($\frac{1}{4}$P) in phase from one another with respect to the magnetic teeth 11a or 11b1, 11b2 of the stationary body 11, in the order of the magnetic poles 13a to 15a, 13b to 15b, 13d to 13d, and 13c to 15c.

Next, there will be described operations of the above described linear pulse motor with reference to FIG. 6 to FIG. 9.

Figures 6A, 6B:
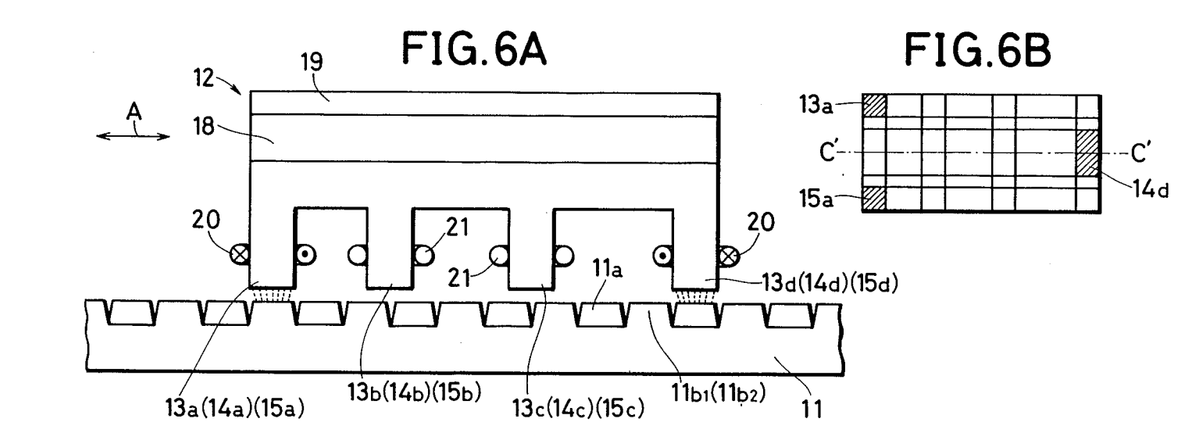

A positive DC current +I is supplied to the one coil 20 for a predetermined time. Induced magnetic fluxes by the coil 20 are added to the magnetic flux Φ from the permanent magnet 18 in the magnetic poles 13a, 15a and 14d, while they are cancel the magnetic flux from the permanent magnet in the magnetic poles 14a, 13d and 15d. Magnetic pull forces act between the adjacent ones of the side magnetic teeth 11b1, 11b2 of the stationary body 11 and the magnetic poles 13a, 15a of the movable body 12, and between the adjacent one of the central magnetic teeth 11a of the stationary body 11 and the magnetic pole 14d of the movable body 12, as shown by the dotted lines in FIG. 6A. FIG. 6B shows the pole surfaces (hatched) of the magnetic poles on which the magnetic pull forces act.

The movable body 12 steps forwards by $\frac{1}{4}$P so as to take the position shown in FIG. 6A.

Figures 7A, 7B:
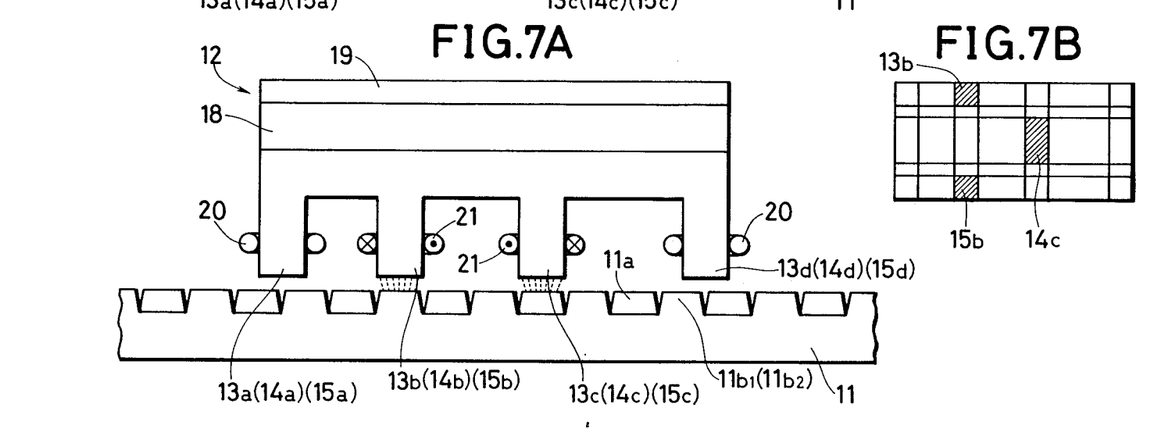

Next, at the same time when the one coil 20 is deenergized, the positive DC current +I is supplied to the other coil 21 for the predetermined time. Induced magnetic fluxes by the coil 21 are added to the magnetic flux Φ from the permanent magnet 18 in the magnetic poles 13b, 15b and 14c, while they are cancelled with it in the magnetic poles 14b, 13c and 15c. Magnetic pull forces act between the adjacent ones of the side magnetic teeth 11b1, 11b2 of the stationary body 11 and the magnetic poles 13b, 15b of the movable body 12, and between the adjacent one of the central magnetic teeth 11a of the stationary body 11 and the magnetic pole 14c of the movable body 12, as shown by the dotted lines in FIG. 7A. FIG. 7B shows the pole surfaces (hatched) of the magnetic poles on which the magnetic pull forces act. The movable body 12 steps forwards by ¼P so as to take the position shown in FIG. 7A, from the position shown in FIG. 6A.

Figures 8A, 8B:
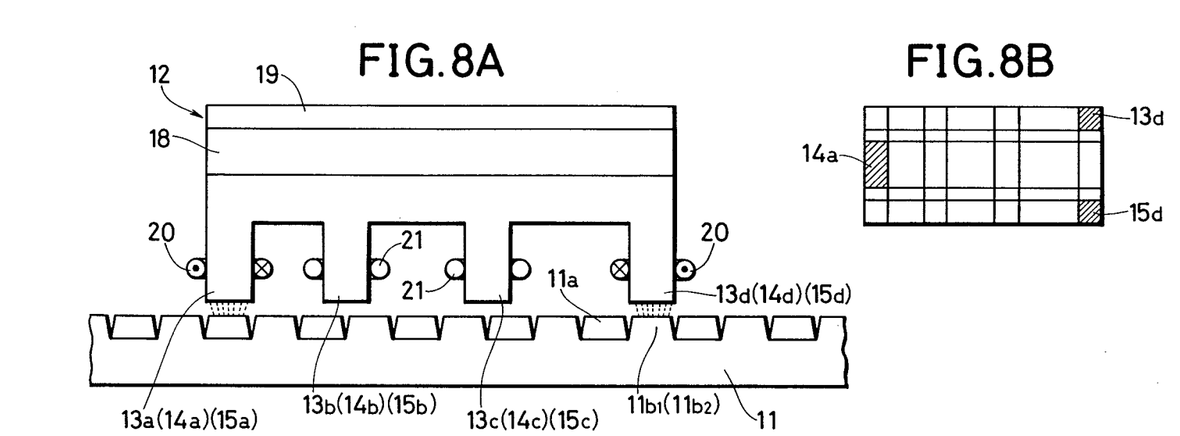

Next, at the same time when the other coil 21 is deenergized, a negative DC current −I is supplied to the one coil 20 for the predetermined time. Induced magnetic fluxes by the coil 20 are added to the magnetic flux Φ from the permanent magnet 18 in the magnetic poles 13d, 15d and 14a, while they are cancelled with it in the magnetic poles 14d, 13a and 15a. Magnetic pull forces act between the adjacent ones of the side magnetic teeth 11b1, 11b2 of the stationary body 11 and the magnetic poles 13d, 15d of the movable body 12, and between the adjacent one of the central magnetic teeth 11a of the stationary body 11 and the magnetic pole 14a of the movable body 12, as shown by the dotted lines in FIG. 8A. FIG. 8B shows the pole surfaces (hatched) of the magnetic poles on which the magnetic pull forces act. The movable body 12 steps forwards by ¼P so as to take the position shown in FIG. 8A, from the position shown in FIG. 7A.

Figure 9A:
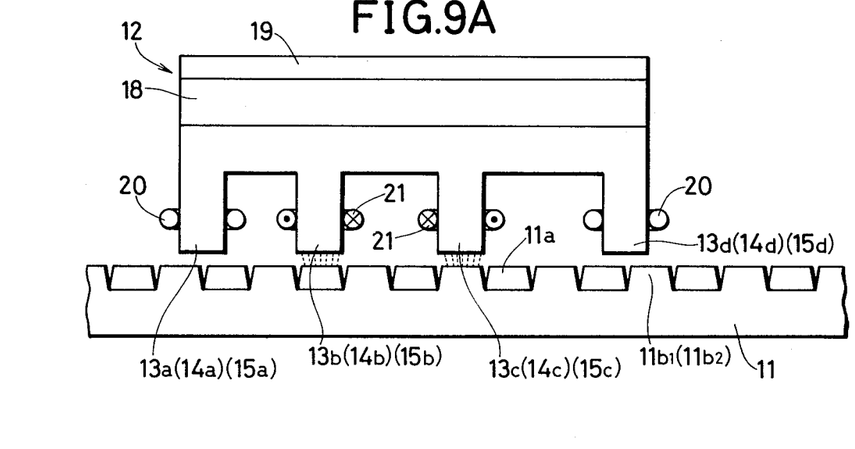
Figure 9B:
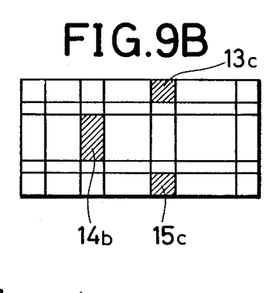

Next, at the same time when the one coil 20 is deenerigized, the negative DC current −I supplied to the other coil 21 for the predetermined time. Induced magnetic fluxes by the coil 21 are added to the magnetic flux Φ from the permanent magnet 18 in the magnetic poles 13c, 15c and 14b, while they are cancelled with it in the magnetic poles 14c, 13b and 15b. Magnetic pull forces act between the adjacent ones of the side magnetic teeth 11b1, 11b2 of the stationary body 11 and the magnetic poles 13c, 15c of the movable body 12, and between the adjacent one of the central magnetic teeth 11a of the stationary body 11 and the magnetic pole 14b of the movable body 12, as shown by the dotted lines in FIG. 1. FIG. 9B shows the pole surfaces (hatched) of the magnetic poles on which the magnetic pull forces act. The movable body 12 steps forwards by ¼P so as to take the position shown in FIG. 9A, from the position shown in FIG. 8A.

The above operation (FIG. 6A to FIG. 9A) are repeated, and the movable body 12 moves forwards ¼P by ¼P. Actually, it looks continuously to move forwards.

As above described, the magnetic poles (13a, 15a) and 14d on which the magnetic pull forces act in the mode of FIG. 6A, are substantially at the same distance from the center of the movable body 12 in the moving direction A. Similiary, the magnetic poles (13b, 15b) and 14c (in the mode of FIG. 7A), (13d, 15d) and 14a (in the mode of FIG. 8A) and (13c, 15c) and 14b (in the mode of FIG. 9A) are substantially at the same distance from the center of the movable body 12 in the moving direction A. Substantially the same magnetic pull forces act at both sides of the center of the movable body 12 on every pitch motion. Accordingly, the magnetic pull forces always balance at both the center. Although not shown, front and rear bearings provided on the right and left and portions of the movable body 12 do not vibrate, and so the noise level can be reduced. Further, in the above embodiment, substantially the same magnetic pull forces act at body sides of the center line $c^1$–$c^1$ along the moving direction A of the movable body 12 on every pitch motion (refer to FIG. 6B to FIG. 9B).

Further, in the above embodiment, the magnetic force center (stable point) can be determined by a pair of the substantially same magnetic forces at both sides of the center. Accordingly, even when the iron cores 13, 14 and 15 thermally expand, the characteristics of the linear pulse motor do not change. An accurate stop or positioning can be always obtained.

Figure 11:
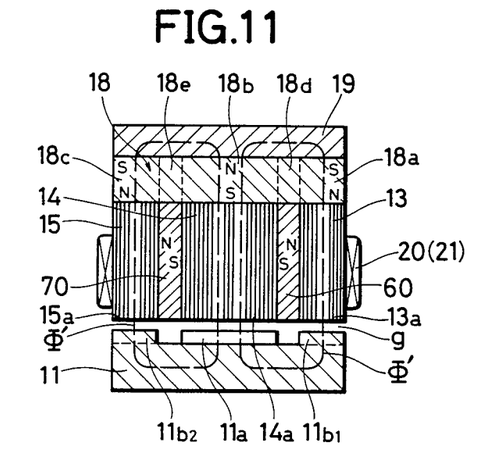
FIG. 11 is a cross-sectional view of a linear pulse motor according to a second embodiment of this invention, similar to FIG. 5.

FIG. 11 shows a second embodiment of this invention. Parts in FIG. 11 which correspond to those in FIG. 5 of the first embodiment, are denoted by the same reference numerals.

First, the demerit of the first embodiment will be described with reference to FIG. 10, for facilitating the understanding of the second embodiment.

Figure 10:
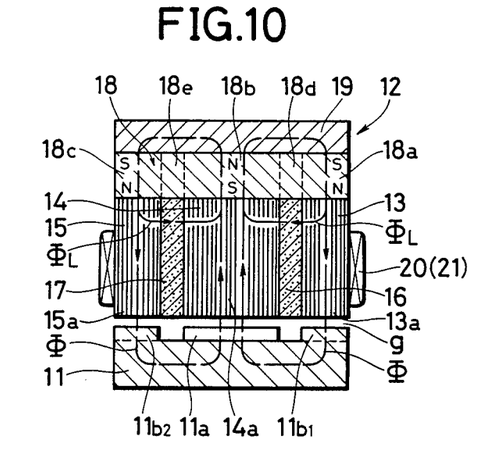
FIG. 10 is a cross-sectional view similar to FIG. 5 for explaining the demerit of the first embodiment.

In FIG. 10, the spacers 16 and 17 are made of non-magnetic material. However, leak magnetic flux ΦL always occurs. Accordingly, amount of main magnetic flux Φ to flow in the stationary body 11 is decreased. The efficiency of the linear pulse motor is lowered. Extra energy should be consumed to compensate the leak magnetic flux ΦL for a predetermined drive force. Further, pull force is decreased, and spring constant of the bearing is lowered. The noise level is high.

The above drawback of the first embodiment can be removed by the second embodiment shown in FIG. 11. Auxiliary permanent magnets 60 and 70 are used instead of the spacers 16 and 17 of the first embodiment. Polarities of the magnets 60 and 70 are so determined as shown in FIG. 11, in relation to the polarities of the main permanent magnet 18. Thus, little leak magnetic flux occurs. Almost all of magnetic flux Φ' flow in the stationary body 11.

With the arrangements of FIG. 11, the efficiency of the linear pulse motor can be improved. The linear pulse motor can.be small-sized for the constant drive force. The magnetic pull force between the movable body and the stationary body can be increased. Accordingly, the spring constant of the bearing can be increased, and so the noise level can be decreased.

The other operations, effects and merits of the second embodiment are the same as those of the first embodiment.

While the preferred embodiments have been described, variations thereto will occur to those skilled in the art within the scope of the present inventive concepts which are delineated by the following claims.

For example, in the above embodiment, plural teeth may be formed in the lower surfaces of the magnetic poles 13a to 15a, 13b to 15b, 13c to 15c and 13d to 15d, respectively. In that case, plural teeth are formed correspondingly in the upper surfaces of the magnetic teeth 11a, 11b1 and 11b2, respectively.

Further, in the above embodiment, the movable body 12 includes three iron cores 13, 14 and 15. However, it may include two or more than three iron cores.

Figure 12:
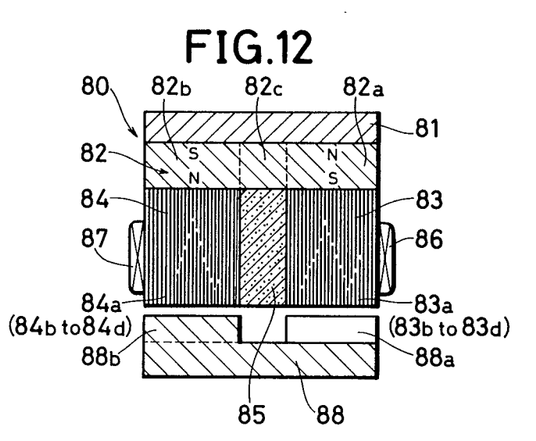
FIG. 12 is a cross-sectional view of a linear pulse motor according to one modification of this invention, similar to FIG. 5.
Figure 13A:
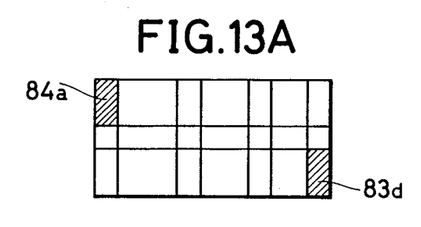
FIG. 13 FIG. 13D are views similar to FIG. 4 for explaining the operation of the modification.
Figure 13B:
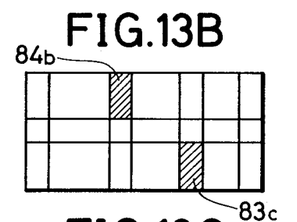
Figure 13C:
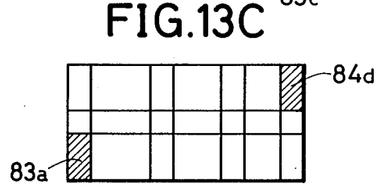
Figure 13D:
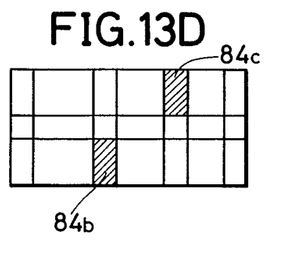

FIG. 12 shows one modification of a linear pulse motor including two iron cores.

In FIG. 12, a movable body 80 consists of a backplate 81, a permanent magnet 82, two iron cores 83 and 84 and coils 86 and 87. The permanent magnet 82 consists of magnet regions 82a and 82b oppositely magnetized to each other, and non-magnet region 82c interposed between the regions 82a and 82b. The one magnet region 82a is superimposed on the one iron core 83, while the other magnet region 82b is superimposed on the other iron core 84. The iron cores 83 and 84 are magnetically separated from each other by a spacer 85 made of non-magnetic material.

The iron cores 83 and 84 include four magnetic poles 83a to 83d and 84a to 84d, respectively, in the same manner as in the above embodiments.

Two rows of magnetic teeth 88a and 88b are formed in a stationary body 88 made of magnetic material. The magnetic teeth 88a and 88b are shifted in phase by a half of pitch (½P) from each other. The one coil 86 is wound on the magnetic poles 83a, 84a and 83d, 84d in the same manner as the one coil 20 of the above embodiment. The other coil 87 is wound on the magnetic poles 83b, 84b and 83c, 84c in the same manner as the other coil 21 of the above embodiment. The coils 86 and 87 are energized and changed over in the same manner as the coils 20 and 21 of the above embodiment. The magnetic pull forces are generated at both sides of the center of the movable body 80 in the moving direction. FIG. 13A to FIG. 13D show the magnetic poles on which the magnetic pull forces act, every ¼ pitch.

It will be understood that the same effect as the above embodiment can be obtained by the modification.

In the above embodiment, the central row of the magnetic teeth 11a is shifted from the side rows of the magnetic teeth 11b1, 11b2 by ½P in phase. The magnetic poles of the central iron core 14 may also be shifted from those of the side iron cores 13, 15 by ½P in phase, in the movable mody. In that case, the three rows of the magnetic teeth are aligned with each other in phase.

In the above embodiment, the linear pulse motor is of two phase motor type. Instead, it may be of three phase motor type. In that case, the movable body moves by 1/6 pitch.

What is claimed is:

1. A linear pulse motor comprising:
   (A) a linearly extending stationary body defining a moving direction along the length thereof;
   (B) a movable body supported in closely spaced relationship relative to said stationary body such that an air gap is created between the stationary body and the movable body and said movable body is able to move along said stationary body in the moving direction; said movable body having a first center line disposed perpendicular to the moving direction and a second center line disposed parallel to the moving direction and having a plurality of iron cores provided with coil means, said iron cores extending along the movable body parallel to said moving direction and having a plurality of magnetic poles, said plurality of magnetic poles consisting of a first set of magnetic poles and a second set of magnetic poles wherein said first set of magnetic poles and said second set of magnetic poles are arranged on opposite sides of said first center line; said stationary body having magnetic circuit forming means for forming magnetic circuits with said iron cores across said air gap, said plurality of magnetic poles extending towards said magnetic circuit forming means; and
   (C) permanent magnet means magnetized in the direction perpendicular to said stationary body and arranged on said iron cores such that magnetic fluxes therefrom interact with magnetic fluxes generated by energization of said coil means, wherein said coil means is so arranged and energized that magnetic forces are generated at the same time between one or more of said first set of magnetic poles and said magnetic circuit forming means of the stationary body and between one or more of said second set of magnetic poles and said magnetic circuit forming means of the stationary body, said one or more of said first set of magnetic poles being substantially at the same distance from said first center line as said one or more of said second set of magnetic poles, and said magnetic forces at both sides of said first center line being substantially equal to one another, whereby said movable body can be prevented from vibrating in the moving direction.

2. A linear pulse motor according to claim 1, in which said iron cores are magnetically separated from each other by spacers made of non-magnetic material, interposed between said iron cores.

3. A linear pulse motor according to claim 1, in which auxiliary permanent magnets are interposed between said iron cores, said auxiliary permanent magnets being so polarized as to prevent leak magnetic fluxes.

4. A linear pulse motor according to claim 1, in which said plurality of iron cores include three iron cores and said plurality of magnetic poles include four magnetic poles, said coil means consists of two coils, one of said two coils being wound on the first and fourth ones of said respective four magnetic poles of the iron cores, and the other of said two coils being wound on the second and third ones of said respective four magnetic poles of the iron cores, the winding directions of said soils being opposite in said first and fourth ones and said second and third ones, respectively.

5. A linear pulse motor according to claim 4, in which said magnetic circuit forming means includes three rows of magnetic teeth each one of said rows of said magnetic teeth facing a corresponding one of said iron cores, respectively.

6. A linear pulse motor according to claim 5, in which the center row of said three rows of magnetic teeth is shifted from the side rows of said three rows by a half of pitch in phase.

7. A linear pulse motor accordance to claim 6, in which said coils are alternately energized, and changed over in polarity.

8. A linear pulse motor comprising:
   (A) a movable body including: three iron cores, each of said iron cores having four downwardly extending magnetic poles spaced along the length of the iron cores in the moving direction of said movable body; a permanent magnet mounted on said three iron cores; a backplate mounted on said permanent magnet; and a first coil individually wound on the outer two magnetic poles and a second coil individually wound on the inner two magnetic poles, the windings on the outer two magnetic poles being in opposite directions and the windings on the inner two magnetic poles being in opposite directions;
   (B) a stationary body made of magnetic material including: three rows of magnetic teeth arranged along said moving direction where the center rows of said three rows of magnetic teeth is shifted in phase from the side rows of said three rows of magnetic teeth by a half of pitch; a magnetic flux generated by said permanent magnet through the magnetic poles of said movable body, the magnetic material of the stationary body, and the magnetic teeth; variable magnetic fluxes being generated by the sequential energization and changes in polarity of said coils; the variable magnetic fluxes generated by the coils and said magnetic flux of the permanent magnet interacting to create magnetic forces which symmetrically act on the movable body relative to a center line of the movable body in the moving direction to prevent vibrations.

* * * * *